UNITED STATES PATENT OFFICE.

CARL R. DE LONG, OF WASHINGTON, DISTRICT OF COLUMBIA, AND WARREN NEAL WATSON, OF AUBURN, MAINE.

PROCESS OF VULCANIZATION OF NATURAL OR ARTIFICIAL RUBBER OR RUBBER-LIKE SUBSTANCES.

1,364,732.     Specification of Letters Patent.     Patented Jan. 4, 1921.

No Drawing.     Application filed July 20, 1920. Serial No. 397,801.

*To all whom it may concern:*

Be it known that we, CARL R. DE LONG, a citizen of the United States, residing at Washington, District of Columbia, and WARREN N. WATSON, a citizen of the United States, residing at Auburn, in the county of Androscoggin and State of Maine, have invented certain new and useful Improvements in Processes of Vulcanization of Natural or Artificial Rubber or Rubber-like Substances, of which the following is a specification.

Our invention relates to the art of vulcanizing natural or artificial rubber or rubber-like substances and has for its object to obtain the desired vulcanization in a much shorter time than is possible when pursuing the ordinary methods of vulcanizing now in vogue; and at the same time to obtain a well vulcanized product. According to our invention there is added to the rubber or other substance to be vulcanized a suitable quantity of dichloranilin, which may be any of the isomeric forms of this substance, or a mixture of any of these forms.

In practising our invention dichloranilin in the proportion of .5 to 5 per cent. by weight is added to the mixture to be vulcanized, either along with the sulfur, or separate therefrom and with or without any other substances that may be used in compounding rubber products, and is thoroughly mixed through such substance in any well-known manner, and by means of any approved apparatus. The mixture being completed, and thorough, the rubber is vulcanized by subjecting it to the desired degree of heat according to well-known procedure. A well vulcanized product is the result of the process, and this we obtain in a much shorter time than is obtained by the ordinary methods of vulcanizing, the dichloranilin serving as an accelerating substance to hasten the vulcanizing process and the union between the sulfur and rubber or rubber-like substance. The proportion of dichloranilin employed will be varied to suit the nature of the vulcanized product to be produced, the length of time which is to be taken in completing the vulcanizing operation, etc. As a general proposition the larger the proportion of dichloranilin used the more rapid the vulcanizing process. Likewise in producing hard rubber a larger proportion of the dichloranilin will be used.

Our invention is unique in that we are the first, as we believe, to utilize dichloranilins as accelerating agents in the vulcanization of natural or artificial rubber or rubber-like substances. Among the advantages incident to the use of these substances are: Dichloranilin in its different forms or modifications is manufactured from a by-product of certain dye-making processes and therefore may be secured at low cost as there is now but small demand for this substance. Again, the degree of heat required to volatilize dichloranilin, in any of its forms, is so much above the degree of heat employed in vulcanizing rubber and rubber-like substances that there is very little vaporization of this substance during the vulcanizing process, and hence the amount of dichloranilin vapors given off is very small. Dichloranilin may therefore be safely used as an accelerating agent in the vulcanizing of rubber, whereas many other substances that have been suggested for use as accelerating agents are highly objectionable on account of the poisonous and unpleasant vapors that are given off, owing to their relatively low temperature of vaporization.

Having described our invention what we claim is:—

1. In the art of vulcanizing rubber or rubber-like substances the addition of dichloranilin to the substance to be vulcanized prior to the vulcanizing step.

2. In the art of vulcanizing rubber or rubber-like substances, subjecting a mixture of the substance to be vulcanized and sulfur to a vulcanizing heat in the presence of dichloranilin.

3. The process of accelerating the vulcanization of natural or artificial rubber or rubber-like substances, which consists in thoroughly mixing with the substance to be vulcanized sulfur and dichloranilin and then subjecting such mixture to heat to secure vulcanization, the presence of the dichloranilin serving to accelerate vulcanization.

4. A vulcanized product comprising a rubber or rubber-like substance, through which has been thoroughly mixed sulfur and dichloranilin, and vulcanized after such mixture.

CARL R. DE LONG.
WARREN NEAL WATSON.